United States Patent
Jang

(10) Patent No.: US 6,931,067 B2
(45) Date of Patent: Aug. 16, 2005

(54) APPARATUS AND METHOD FOR IMAGE CODING USING TREE-STRUCTURED QUANTIZATION BASED ON WAVELET TRANSFORM

(75) Inventor: Woo-young Jang, Seoul (KR)

(73) Assignee: Samsung Electronics Co., Ltd. (KR)

(*) Notice: Subject to any disclaimer, the term of this patent is extended or adjusted under 35 U.S.C. 154(b) by 528 days.

(21) Appl. No.: 10/044,040

(22) Filed: Jan. 11, 2002

(65) Prior Publication Data

US 2002/0131497 A1 Sep. 19, 2002

(30) Foreign Application Priority Data

Feb. 7, 2001 (KR) .......................................... 2001-5946

(51) Int. Cl.[7] .............................................. H04B 1/66

(52) U.S. Cl. ........................... 375/240.19; 375/240.03; 375/240.16; 375/240.27; 375/240.26; 375/240.12; 375/240.18; 382/253; 382/249; 382/240; 382/239; 382/238; 348/699

(58) Field of Search ....................... 375/240.19, 240.03, 375/240.02, 240.12, 240.16, 240.18, 240.26, 240.27; 382/253, 238, 239, 249, 240, 248; 348/699

(56) References Cited

U.S. PATENT DOCUMENTS 5,974,181 A * 10/1999 Prieto .......................... 382/232
6,298,167 B1 * 10/2001 Martucci et al. ............. 382/248
6,519,284 B1 * 2/2003 Pesquet-Popescu
et al. ...................... 375/240.11

* cited by examiner

Primary Examiner—Shawn S. An
(74) Attorney, Agent, or Firm—Mills & Onello LLP

(57) ABSTRACT

An apparatus for image coding using tree-structured vector quantization based on a wavelet transform and a method therefor are provided. The apparatus for image coding using a tree-structured vector quantization based on wavelet transform has a wavelet transform unit, a vector construct unit, an error vector unit, a scan unit, a first quantization unit and a second quantization unit. The wavelet transform unit wavelet transforms an input image signal. The vector construct unit constructs vectors, each having a tree structure in a different direction, using the wavelet transformed result. The error vector generation unit generates a plurality of error vectors by setting one of the vectors as a basic vector and performing a calculation on each of the vectors remaining with respect to the basic vector. The scan unit scans the coefficients of each of the basic vector and error vectors in a different direction. The first vector quantization unit generates a first codebook for the basic vector scanned in the scan unit, quantizes the scanned basic vector using the first codebook, and outputs the quantization result as the index of the first codebook. The second vector quantization unit generates a second codebook for the error vectors scanned in the scan unit, quantizes the scanned error vectors using the second codebook, and outputs the quantization results as the indices of the second codebook. According to the apparatus and method, the advantages of wavelet vector quantization and zerotree-coding are maximized so that the size of a codebook is reduced and the coding performance is improved.

14 Claims, 9 Drawing Sheets

FIG. 5
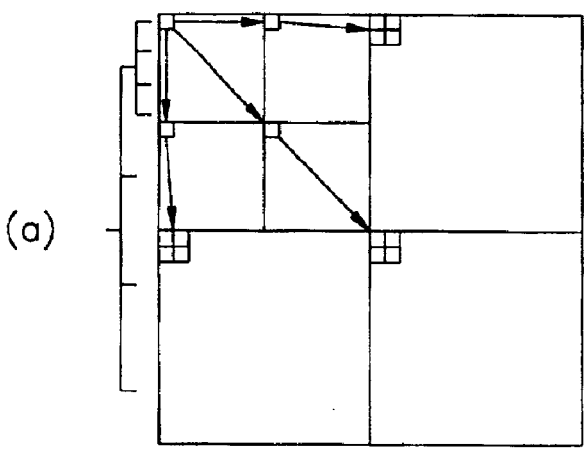
(a)
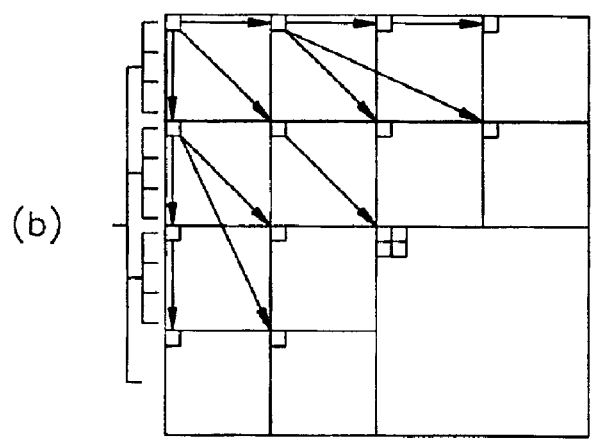
(b)
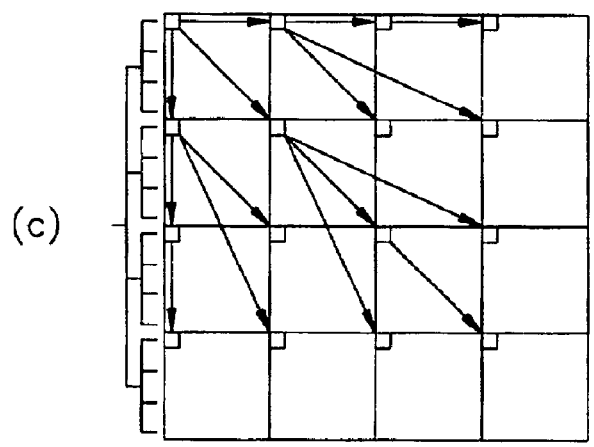
(c)

FIG. 6
(a)
(b)
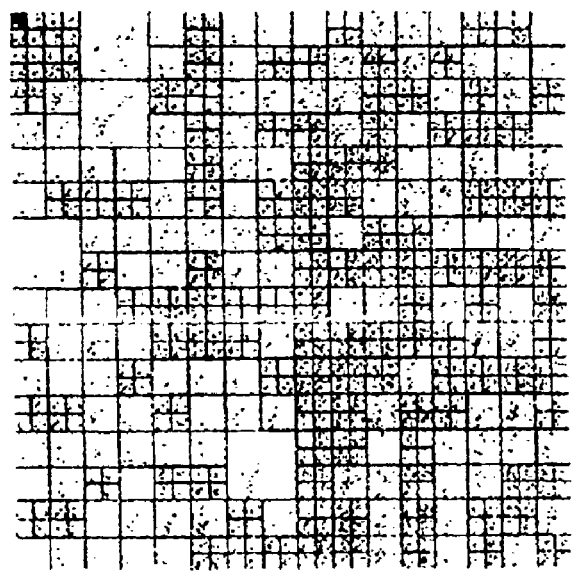

FIG. 7
(a)
(b)
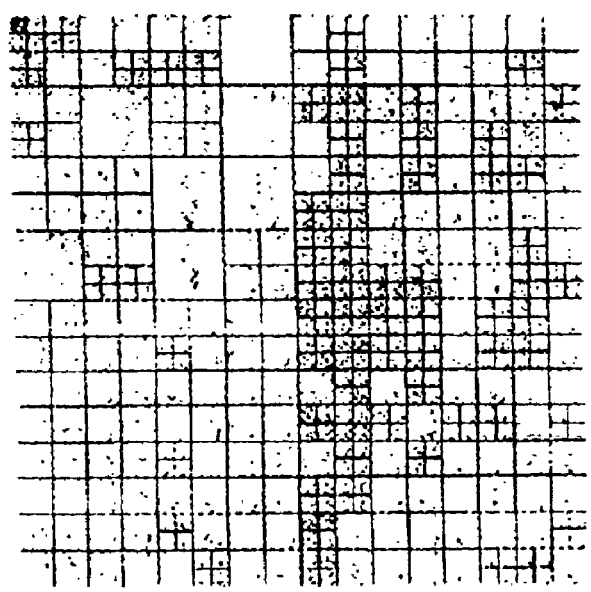

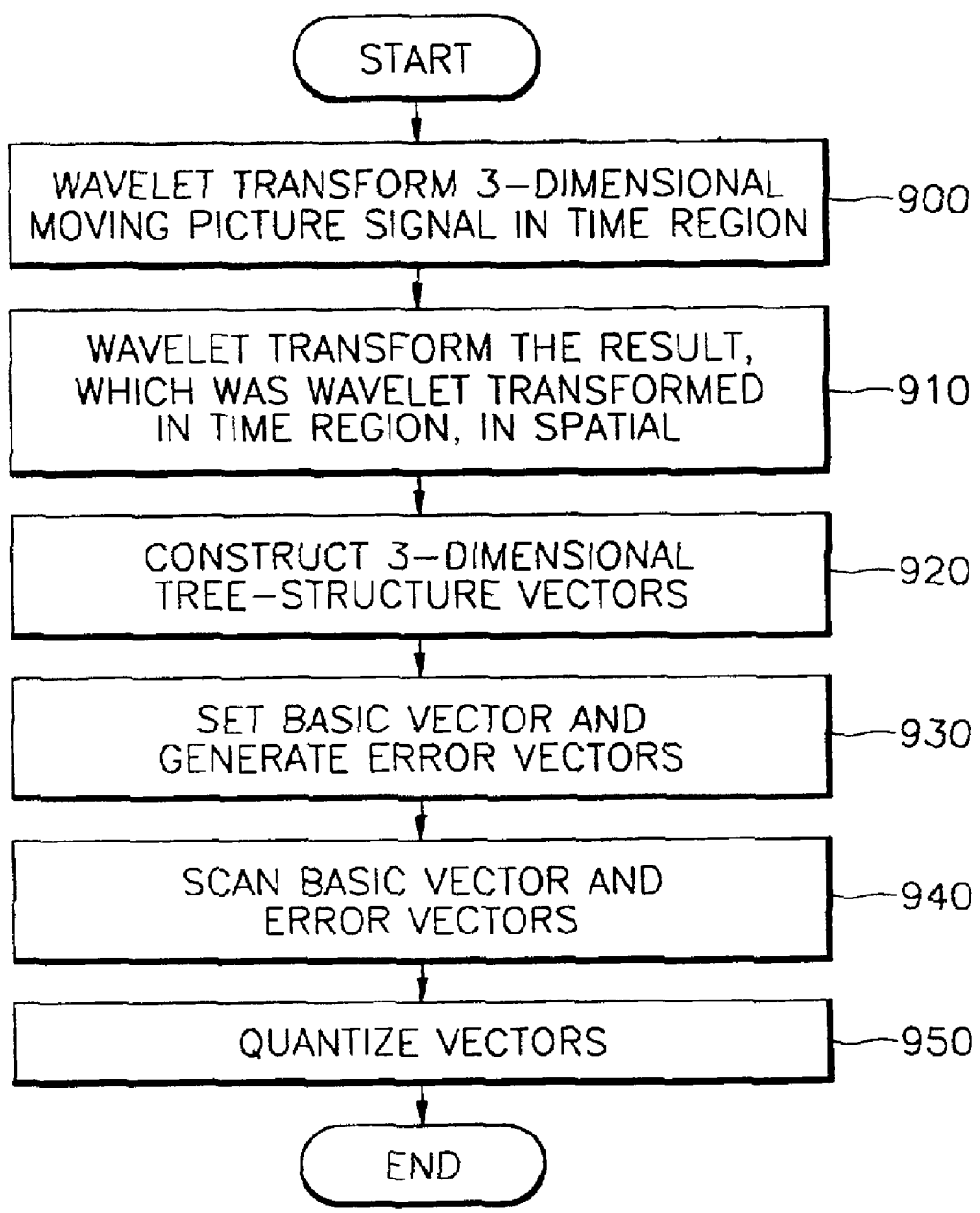

APPARATUS AND METHOD FOR IMAGE CODING USING TREE-STRUCTURED QUANTIZATION BASED ON WAVELET TRANSFORM

BACKGROUND OF THE INVENTION

1. Field of the Invention

The present invention relates to image coding for image signal compression, and more particularly, to an apparatus for image coding using tree-structured quantization based on a wavelet transform.

2. Description of the Related Art

In recent years, research into image coding methods using a wavelet transform has been very active in line with growing demands for wireless image communications related to multimedia applications and widespread Internet use. Here, the wavelet transform means a conversion in which a signal is reconstructed with a plurality of very simple basic functions. That is, the wavelet transform is a method in which data, functions, or operators are decomposed into different frequency components and a resolution and related component corresponding to each scale can be probed. Compared to the Fourier transform, the basic functions of the wavelet transform have a superior time-frequency localization. A process for wavelet-coding an image is formed of removing correlations in an image, quantizing sub-band coefficients, and entropy-coding of quantization coefficients. Since most of the energy is converged into the low-frequency band if an image is transformed into wavelet coefficients, many coefficients in the high-frequency band will have very little energy. Since these coefficients generate small errors, it is efficient to quantize these coefficients into '0' and to indicate their location information using correlations between sub-bands.

Compression methods using the wavelet transform are divided into two groups: one group using a pixel-based zerotree, represented by an embedded zerotree wavelet (EZW) and the other group using a block-based compression method using vector quantization. The EZW uses a zerotree structure for compressing a coefficient map. A zerotree coding method is formed of a sorting process with respect to size, a sorted bit plane transmitting process, and an insignificant coefficient prediction process using similarity between different scales in a wavelet transformed image according to a set partitioning sorting algorithm. The zerotree coding method shows good performance in compression ratio and picture quality and is capable of sequential image restoration. However, the structures of an encoder and decoder for the zerotree coding method are very complicated and computation is relatively complex. Also, the zerotree coding method is sensitive to an environment with much noise because the output bit stream always has a reverse order in the zerotree coding method. If a bit is damaged by noise, it may cause an error in the whole image signal because a vector and coefficients comprising the damaged bit are transmitted with the error.

Meanwhile, the wavelet coding method using vector quantization has two approaches. In the first approach, each wavelet sub-band is divided into block units, and each sub-band is compressed through bit allocation using a different vector quantizer. In the second approach, pixels of the same spatial location in each sub-band are collected and converted into a vector and coded. In the second approach, a vector is generated traversing each sub-band and one codebook is generated during vector quantization. The vector quantization method needs a simpler structure and less computation, and has an error tolerance. However, the coding performance of the vector quantization is poor. The zerotree coding method and the wavelet vector quantization method have their respective merits and drawbacks. Therefore, a new image coding method which maximizes the merits of these methods is needed.

SUMMARY OF THE INVENTION

It is a first object of the present invention to provide an image coding apparatus which is based on wavelet vector quantization and uses correlations between sub-bands of wavelet coefficients used in a zerotree coding method so that coding performance can be improved.

It is a second object of the present invention to provide an image coding method performed in the image coding apparatus.

In accordance with an aspect of the present invention, there is provided an apparatus for coding an image signal. The apparatus includes a wavelet transform unit for wavelet transforming an input image signal. A vector construct unit constructs vectors, each having a tree structure in a different direction, using the wavelet transformed result. An error vector generation unit generates a plurality of error vectors by setting one of the vectors as a basic vector and performing a calculation on each of vectors remaining with respect to the basic vector. A scan unit for scans the coefficients of each of the basic vector and error vectors in a different direction. A first vector quantization unit generates a first codebook for the basic vector scanned in the scan unit, quantizes the scanned basic vector using the first codebook, and outputs the quantization result as the index of the first codebook. A second vector quantization unit generates a second codebook for the error vectors scanned in the scan unit, quantizes the scanned error vectors using the second codebook, and outputs the quantization results as the indices of the second codebook.

In accordance with another aspect of the present invention, there is provided a method for coding an image signal. According to the method, an input image signal is wavelet transformed. A vector is constructed having a tree structure in the horizontal direction, in the vertical direction, and in the diagonal direction, using the wavelet transformed result. The diagonal direction vector is set as a basic vector and a plurality of error vectors are generated by performing a calculation on each of the horizontal direction vector and vertical direction vector with respect to the basic vector. The basic vector and error vectors are scanned according to different methods. A first codebook is generated for the scanned basic vector; the scanned data is quantized using the first codebook; and the quantization result is output as the index of the first codebook. A second codebook is generated for the scanned error vectors; the scanned data is quantized using the second codebook; and the quantization results are output as the second and third indices of the second codebook.

In accordance with still another aspect of the invention, there is provided another method for coding an image signal. An input 3-dimensional (3D) moving picture signal is wavelet transformed in a time region. The result of the wavelet transform is wavelet transformed in a spatial region. Vectors are constructed such that each vector has a 3D tree structure, using the wavelet transformation results. One of the vectors, each having a tree structure, is set as a basic vector, and a plurality of error vectors are generated from the remaining vectors using the basic vector. The basic vector and error vectors are scanned according to different methods. The scanned basic vector and error vectors are quantized.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

FIGS. 5(a) through 5(c) are schematic diagrams of various tree structures in a wavelet packet transform.

FIGS. 6 and 7 are diagrams illustrating the results of the wavelet packet transform.

FIG. 10 is a flowchart of a method for image coding by a 3-dimensional wavelet transform.

DESCRIPTION OF THE PREFERRED EMBODIMENTS

Figure 1:
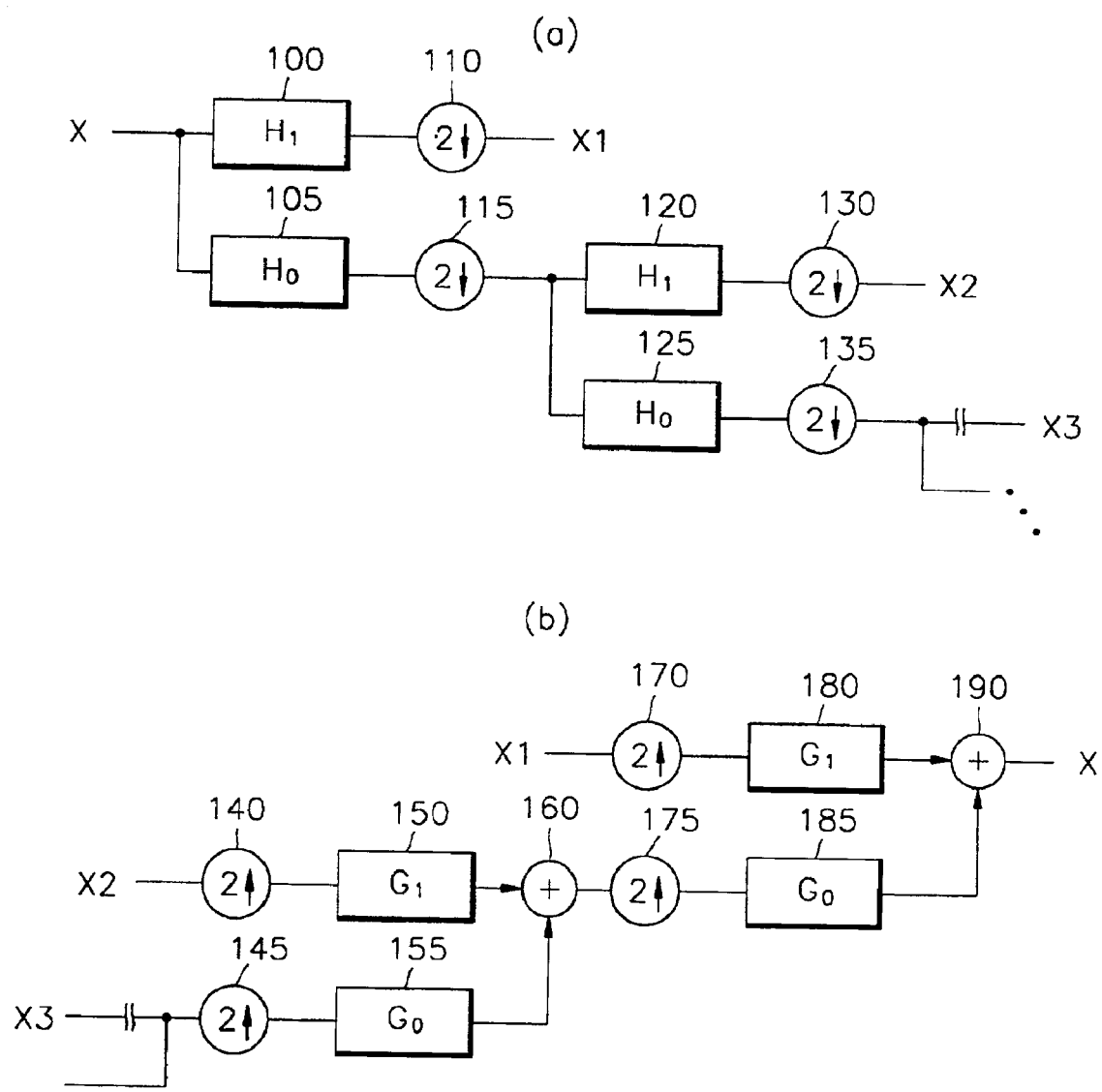
FIGS. 1(a) and 1(b) are schematic diagrams of a typical wavelet transform apparatus.

A typical wavelet transform will now be described before describing an image signal coding apparatus according to the present invention. FIG. 1(a) is a schematic diagram of a wavelet transform apparatus for decomposition and FIG. 1(b) is a schematic diagram of a wavelet transform apparatus for reconstruction. Referring to FIGS. 1(a) and 1(b), a wavelet transform represents a set of functions which are obtained by scaling up/down the result of transition after transiting a basis function $\psi(x)$. WT(a, b), which is the result of wavelet transforming an arbitrary signal f(x), is expressed as the following equation 1:

$$WT(a, b) = \frac{1}{\sqrt{a}} \int \psi \frac{x-b}{a} f(x) dx \quad (1)$$

Here, $\psi$ denotes a mother wavelet, a denotes a size variable, and b denotes a transition variable. At this time, if a and b are real numbers and a is not zero (a, b∈ R, and a≠0), the transform is referred to as a continuous wavelet transform, and, if a and b are integers such that $a=a_0^m$, $b=nb_0a_0^m$, where m, n∈ Z, $a_0>1$, $b_0>0$, the transform is referred to as a discrete wavelet transform. 'a' is for adjusting the size of the wavelet basis, and the transition variable b, which changes on a time axis, is for placing the wavelet basis at a desired location. If a is small, the wavelet basis takes a narrow region on the time axis, and takes a wider region on a frequency axis. Therefore, if $\psi$ is made to have a finer resolution in the high frequency band and to have a relatively lower resolution in the low frequency band, a sudden appearance of a high frequency component in continuous low frequency components can be easily processed. In an ordinary natural image, pixel values change slowly in a flat area and change rapidly in the edges of the image. Therefore, if the wavelet transform is used in image compression, the image signal can be compressed to the maximum with defining the edge of the image. Compared to the wavelet transform having these advantages, it is difficult to process moving picture signals with the short time Fourier transform (STFT) because the resolution of a time-frequency space in the SFTF is fixed.

Referring to FIG. 1(a), the wavelet transform apparatus for decomposition has high frequency band pass filters ($H_1$) 100 and 120, low frequency band pass filters ($H_0$) 105 and 125, and down-samplers 110, 115, 130, and 135. The high frequency band pass filter 100 passes the high frequency band of the image signal (x). The down-sampler 110 down-samples the signal output from the high frequency band pass filter 100 and outputs the down-sampled signal as a first decomposition signal (x1). For example, the output signal of the high frequency band pass filter 100 may be down-sampled so that sampling number is reduced by half. The low frequency band pass filter 105 passes the low frequency band of the image signal (x). The down-sampler 115 down-samples the signal output from the low frequency band pass filter 105 and outputs the down-sampled signal. Also, the high frequency band pass filter 120 and the low frequency band pass filter 125 pass the high frequency band and the low frequency band, respectively, of the output signal of the down-sampler 115 and output the filtered signals. The down-samplers 130 and 135 down-sample the output signals of the filters 120 and 125, respectively, and output the down-sampled signals. At this time, the output signal of the down-sampler 130 is a second decomposition signal (x2). The wavelet transform apparatus of FIG. 1(a), though not shown specifically, is implemented so as to gradually decompose the low frequency band of the input image (x). Generally, to obtain a high resolution in the low frequency band of an image signal, it is preferable that the same filter structure be iteratively used for the low frequency band of the signal without decomposing the high frequency band of the signal, as shown in FIG. 1(a). Here, the iterative filter structure may be referred to as an iterated filter bank, and by implementing the iterated filter bank, the image signal is decomposed. Performing iterative decomposition for the low frequency band is to reduce the width of the low frequency band, and by doing so, a twice-higher frequency resolution can be obtained. Meanwhile, through the twice down-sampling in FIG. 1(a), the resolution of the time axis is reduced by half. The image signal decomposed from the original image signal (x) in FIG. 1(a) can be referred to as x1, x2, x3, . . . , respectively.

Referring to FIG. 1(b), the wavelet transform apparatus for reconstructing images decomposed in FIG. 1(a) has up-samplers 140, 145, 170, and 175, high frequency band pass filters 150 and 180, low frequency band pass filters 155 and 185, and adders 160 and 190. Although the apparatus of FIG. 1(b) has more band pass filters, up-samplers, and adders than shown in FIG. 1(b), FIG. 1(b) shows only a limited number of such devices in order to simplify the drawing.

When it is assumed in FIG.1(b) that the decomposed image signals are x1, x2, x3, . . . , x2 may be the input signal of the up-sampler 140. That is, the up-sampler 140 up-samples the decomposed image signal (x2) and outputs the up-sampled result. For example, by inserting '0' or a predetermined bit between each sample values, the sampling number increases. By doing so, up-sampling is performed. The high frequency band pass filter ($G_1$) 150 passes high frequency band of the output signal of the up-sampler 140. The up-sampler 145 up-samples a signal obtained from a decomposition signal (x3), and the low frequency band pass filter ($G_0$) 155 passes the low frequency band of the output signal of the up-sampler 145. The adder 160 adds the output signals of the band pass filters 150 and 155 and outputs the added signal. At this time, the first decomposition signal (x1) and the output signal of the adder 160 are input to the up-samplers 170 and 175, respectively. The up-samplers 170 and 175 up-sample the respective input signals. The band pass filters 180 and 185 pass the high frequency band of the output signal of the up-sampler 170 and the low frequency band of the output signal of the up-sampler 175, respectively, and output the filtered signals. The adder 190 adds the output signals of the filters 180 and 185 and restores the original image signal (x). That is, in the apparatus of FIG. 1(b), the decomposed signals (x1, x2, x3,) are reconstructed and the original image signal (x) is restored.

As shown in FIGS. 1(a) and 1(b), a wavelet transform apparatus can readily be implemented using an iterated filter bank, which has an advantage in that the computation amount of the apparatus is proportional to the number of inputs regardless of the frequency of iteration. The wavelet transform in FIGS. 1(a) and 1(b) is for a one-dimensional signal. If the wavelet transform is applied to a two-dimensional image, a horizontal iterated filter bank and a vertical iterated filter bank should be separately implemented.

Figure 2:
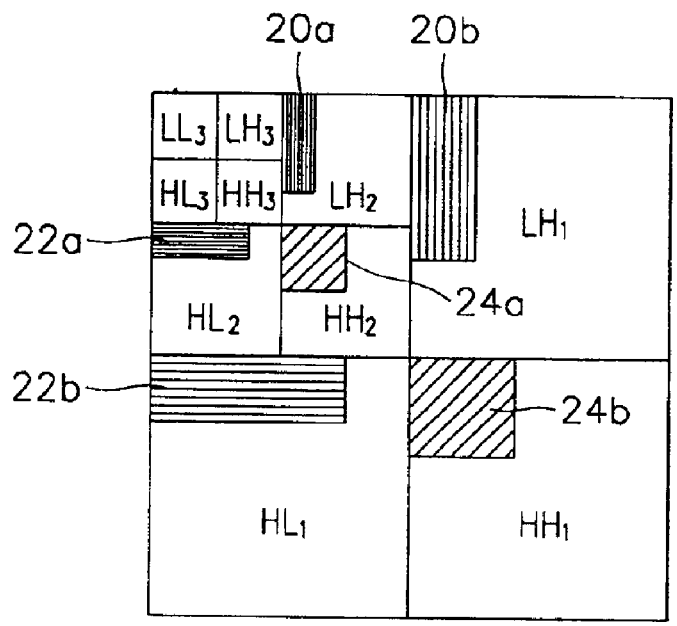
FIG. 2 is a schematic diagram illustrating the continuity of vector coefficients in wavelet transforming in the wavelet transform apparatus shown in FIG. 1.

FIG. 2 is a schematic diagram illustrating the continuity of vector coefficients in wavelet transforming and shows wavelet transforming an image signal to three levels. That is, in an image wavelet transformed to three levels, each wavelet transformed image coefficient is formed of coefficients having the characteristic of each band. Referring to FIG. 2, $HL_3$ in the third level, $HL_2$ in the second and $HL_1$ in the first level indicate bands, each having a low frequency characteristic in the vertical direction and a high frequency characteristic in the horizontal direction.

Also, $LL_3$ is a band having a low frequency characteristic both in the horizontal direction and in the vertical direction, and shows a band characteristic having the greatest energy. $HH_3$, $HH_2$, and $HH_1$ indicate bands having high frequency characteristics both in the horizontal and vertical directions. $LH_3$, $LH_2$, and $LH_1$ indicate bands having a high frequency characteristic in the vertical direction and a low frequency characteristic in the horizontal direction. Therefore, if the low frequency band of a signal is decomposed by the decomposition method of FIG. 1(a), the characteristics of wavelet coefficients as shown in FIG. 2 appear.

Referring to FIG. 2, reference numbers 20a and 20b show the same band characteristics in the vertical direction, reference numbers 22a and 22b show the same band characteristics in the horizontal direction, and 24a and 24b show the same band characteristics in the diagonal direction. As this, wavelet transformed coefficients have continuity in the horizontal direction, vertical direction and diagonal direction, and have different characteristics. This feature is used in compressing an image by the wavelet transform, and low energy coefficients are discarded and high energy coefficients are selected. Therefore, when a vector is formed with these coefficients, a scanning method appropriate to the band characteristics is adopted.

Figure 3:
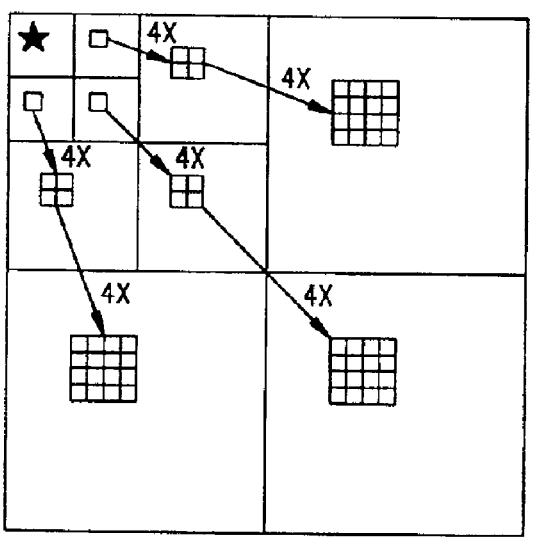
FIG. 3 is a schematic diagram illustrating the tree structure of vector coefficients in wavelet transforming in the wavelet transform apparatus shown in FIG. 1.

FIG. 3 is a schematic diagram for illustrating characteristics of inter-sub-band wavelet coefficients of a wavelet transformed signal. Referring to FIG. 3, the wavelet coefficients can be expressed in a tree structure with respect to the correlations between sub-bands.

As shown in FIG. 3, the coefficients in the upper band have spatial correlations with the coefficients in the lower band. If the coefficient values in the upper band are greater than a predetermined threshold value, the probability that the coefficient values in the lower band, which are in the same spatial location as the coefficients in the upper band, are greater than the predetermined threshold value, is high. Also, three trees, which start from the tree root in the highest level, have similar characteristics. At this time, vector coefficients in each level increase by four times. Since coefficient values contained in one tree start from the same tree root, from which other coefficient values contained in the other two trees of the three trees, the other two trees can be predicted using the first tree. Therefore, only coding the errors of the prediction maximizes the coding efficiency.

Figure 4:
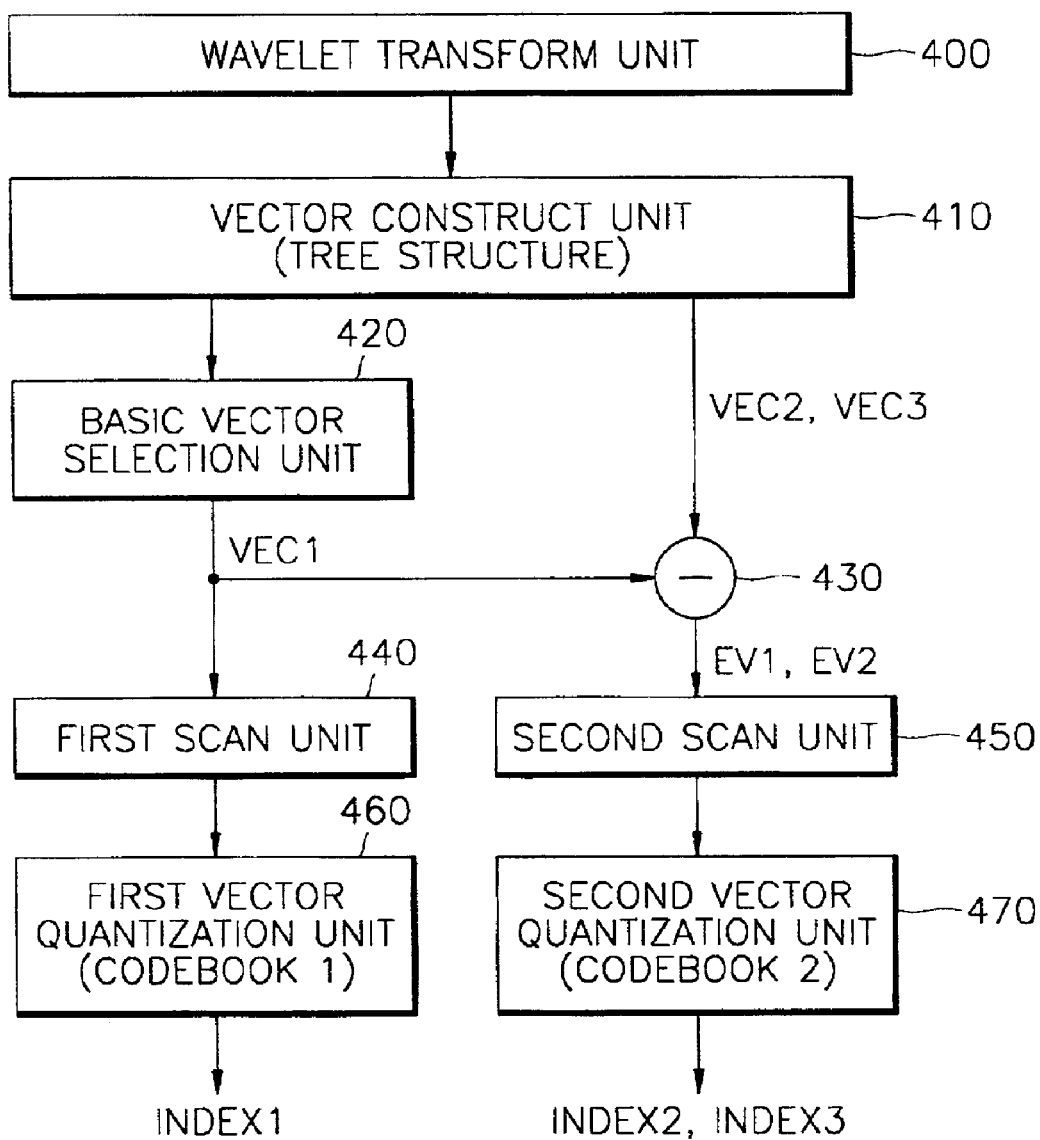
FIG. 4 is a schematic diagram of an image coding apparatus using tree-structured vector quantization based on a wavelet transform according to a preferred embodiment of the present invention.

FIG. 4 is a schematic diagram of an image coding apparatus using tree-structured vector quantization based on vector quantization according to the present invention. Referring to FIG. 4, the image coding apparatus has a wavelet transform unit 400, a vector construct unit 410, a basic vector selection unit 420, a subtracter 430, a first scan unit 440, a second scan unit 450, a first vector quantization unit 460 and a second vector quantization unit 470. The image coding apparatus of FIG. 4 is also applied to 2-dimensional (2D) wavelet transform, 3-dimensional (3D) wavelet transform and 2/3D wavelet packet transform.

The wavelet transform unit 400 wavelet transforms an input image signal (IN), through a 9/7 bi-orthogonal filter, to a predetermined level in a spatial region (in 2D wavelet transform) or in a time region and in a spatial region (in 3D wavelet transform). Here, 9 and 7 denote the number of coefficients of the bi-orthogonal filter. For example, an image signal can be transformed to five levels. At this time, the wavelet transformed result is output as coefficients having different band characteristics. Referring to FIG. 2, the highest level among the wavelet transformed results, that is, LL band, which shows a low frequency characteristic in the horizontal direction and vertical direction, has information visible to the eye. Therefore, many bits are assigned to the highest level band and quantized by a uniform quantizer (not shown). In the wavelet transform unit 400, for a 2D image, wavelet transform is performed in the horizontal direction and vertical direction in the spatial region and, for a 3D image, wavelet transform is performed in the time region and the spatial region.

Receiving signals in each band output from the wavelet transform unit 400, the vector construct unit 410 constructs vectors, each having a tree structure in a different direction. Each vector constructed in the vector construct unit 410 forms a tree in the horizontal direction, in the vertical direction, and in the diagonal direction, respectively. At this time, since these vectors have parent-children relations between sub-bands, coefficients constructing the vectors have similar characteristics. That is, in a tree structure in the same direction, the characteristics of coefficients in a lower band are similar to the characteristics of coefficients in an upper band.

The basic vector selection unit 420 selects a vector which has a predetermined direction among vectors constructed in a tree structure by the vector construct unit 410, preferably a vector of a diagonal direction, as a basic vector (VEC1).

The subtracter 430 subtracts the remaining vectors, except the basic vector, from the basic vector (VEC1), which is selected by the basic vector selection unit 420, and outputs the subtracted results as error vectors (EV1 and EV2). That is, the results output from the subtracter 430 can be regarded as errors obtained to predict vectors from the basic vector (VEC1). Although the subtracter 430 is used in the embodiment in FIG. 4, an adder can also be used to obtain error vectors (EV1 and EV2), by adding the horizontal and vertical vectors (VEC2 and VEC3) to the basic vector (VEC1).

The first scan unit 440 zigzag scans the basic vector (VEC1) in the diagonal direction, considering the continuity of coefficients. The second scan unit 450 scans the errors vectors (EV1 and EV2) in the horizontal direction and in the vertical direction, respectively, considering the continuity of coefficients. Therefore, in a sub-band, a low-high (LH) band is scanned in the vertical direction, a high-low (HL) band is scanned in the horizontal direction, and a high-high (HH) band is scanned in the diagonal direction. At this time, scanning is sequentially performed in each band so that a vector is constructed. By doing so, the continuity of neighboring coefficients in a vector can be improved. In the present invention, spatial correlation is between each band and frequency correlation is inside each band. Therefore, in the present invention, vectors can be combined so that the characteristics of wavelet coefficients in a time-frequency region can be maximized.

The first vector quantization unit 460 generates a first codebook for the basic vector (VEC1) scanned in the first scan unit 440, quantizes the basic vector (VEC1) using the first codebook, and outputs the quantization result as a first index (INDEX1) of the first codebook. Here, the codebook may be defined as a lookup table for a plurality of image patterns. In vector quantization, the codebook is formed of a series of representative vectors which can frequently occur in an image signal.

The second vector quantization unit 470 generates a second codebook for the error vectors (VEC2 and VEC3) scanned in the second scan unit 450, quantizes the error vectors (VEC2 and VEC3) using the second codebook, and outputs the quantization results as a second index and a third index (INDEX2 and INDEX3). Here, since the second codebook is to indicate the errors of the horizontal direction vector and vertical direction vector (VEC2 and VEC3), the size of the second codebook can be reduced compared to a conventional codebook. Here, vector quantization performed in the first vector quantization unit 460 and the second vector quantization unit 470 can be referred to as a loss compression method and randomly sets an initial vector. In generating a codebook, the Linde-Buzo-Gray (LBG) algorithm is used. In the present invention, the number of bits assigned to a codebook to quantize a vector can be different in the first vector quantization unit 460 and the second vector quantization unit 470.

Although not shown specifically, the first index (INDEX1), the second index (INDEX2), and the third index (INDEX3), generated in the image coding apparatus of FIG. 4, are no-loss compressed by arithmetic coding and then transmitted.

The operation of the coding apparatus of FIG. 4 and the coding method thereof will now be described in more detail. First, it is assumed that wavelet transform performed in the wavelet transform unit 400 is performed to the five levels. After wavelet transform, the wavelet transformed result is constructed into a vector having a tree structure in the vector construct unit 410. At this time, a tree is formed in the horizontal direction, in the vertical direction, and in the diagonal direction, and one vector is formed of 341 coefficients (1+4+16+64+256=341). Tree-structured vector coefficients starting from one tree root have boundary information on the horizontal direction, vertical direction, and diagonal direction, and are similar to each other because the trees start from the one tree root. That is, if a first tree is formed of coefficients having high energy, it is highly probable that the remaining two trees have coefficients having high energy similar to the first tree, although the continuity of coefficients is different, and the distribution of energy is similar in each of the trees. Therefore, one tree among the three trees is selected and set as a reference tree, and the remaining two trees are used to obtain errors which will be used in prediction from the selected reference tree. In the present invention, the vector in the diagonal direction is set as a basic vector (VEC1), and error vectors (EV1 and EV2) are generated by subtracting the vectors of the vertical direction and horizontal direction (VEC2 and VEC3), respectively, from the basic vector (VEC1).

The basic vector (VEC1) is zigzag scanned in the first scan unit 440 and the error vectors (EV1 and EV2) are scanned in the second scan unit 450 in the horizontal direction and in the vertical direction, respectively. The first vector quantization unit 460 generates a first codebook for the scanned basic vector (VEC1), and the second vector quantization unit 470 generates a second codebook for the scanned error vectors (EV1 and EV2). Therefore, the results of vector quantization are output as the first index (INDEX1) of the first codebook, and the second index (INDEX2) and the third index (INDEX3) of the second codebook.

For example, if 8-bit image data is input and wavelet transformed to five levels, 2728 bits are needed in coding 341 pixels. However, the first and second vector quantization units 460 and 470 can achieve high compression efficiency by coding image data with one index. That is, without performing Huffman coding or arithmetic coding, which are no-loss compression methods, 1/10 compression can be achieved with $2^{273}$ codebooks. Vector quantization can be performed through a process of training the vectors scanned in the first scan unit and the second scan unit 440 and 450 and codebook vectors included in the first codebook and the second codebook, that is, a continuous comparison process.

Accordingly, the image coding apparatus using wavelet transform according to the present invention can be applied to a 2D or a 3D packet transform. First, wavelet packet transform is a more generalized method than wavelet transform. By selecting a basis appropriate to the time-frequency characteristics of an image among a plurality of wavelet bases, efficient decomposition is enabled. However, in wavelet packet transforming, computation for finding an optimized wavelet packet basis is added and an efficient search algorithm is required. Referring to FIG. 4, a function for performing an efficient search algorithm is added to the wavelet transform unit 400.

FIGS. 5(*a*) through 5(*c*) are schematic diagrams of various tree structures in wavelet packet transforming. FIG. 5(*a*) shows ordinary wavelet transform, FIG. 5(*b*) shows arbitrary wavelet packet transform, and FIG. 5(*c*) shows full sub-band packet transform.

Referring to FIGS. 5(*a*) through 5(*c*), wavelet packet transform is different from ordinary wavelet transform in forming a tree. That is, in wavelet transform in FIG. 5(*a*), a vector is constructed with coefficients in neighboring sub-bands by the correlations between parent-children coefficients. However, in wavelet packet transform, as shown in FIGS. 5(*b*) and 5(*c*), vectors adaptively change according to the result of wavelet packet transform. Therefore, a tree structure, which is formed by the wavelet packet transform, has no regular direction, and has an adaptive structure. That is, although the wavelet transform according to the present invention has a different tree structure when applied to wavelet packet transform, the vector quantization method of FIG. 4 is equally applied to the vector obtained by the wavelet transform and therefore efficient coding is enabled. Although FIG. 5 shows a 2D wavelet packet transform, the wavelet transform according to the present invention can be applied to a 3D moving picture, which is to be described.

FIGS. 6 and 7 are diagrams illustrating the results of the wavelet packet transform. FIGS. 6(a) and 7(a) are original images, and FIGS. 6(b) and 7(b) are respective wavelet packet transformed images. Here, images of FIGS. 6(b) and 7(b) show the results of wavelet packet transformation when an image is coded at 0.5 bits per pixel (bpp).

The wavelet transform according to the present invention can be applied to a 3D moving picture as well as a 2D image.

Figure 8:
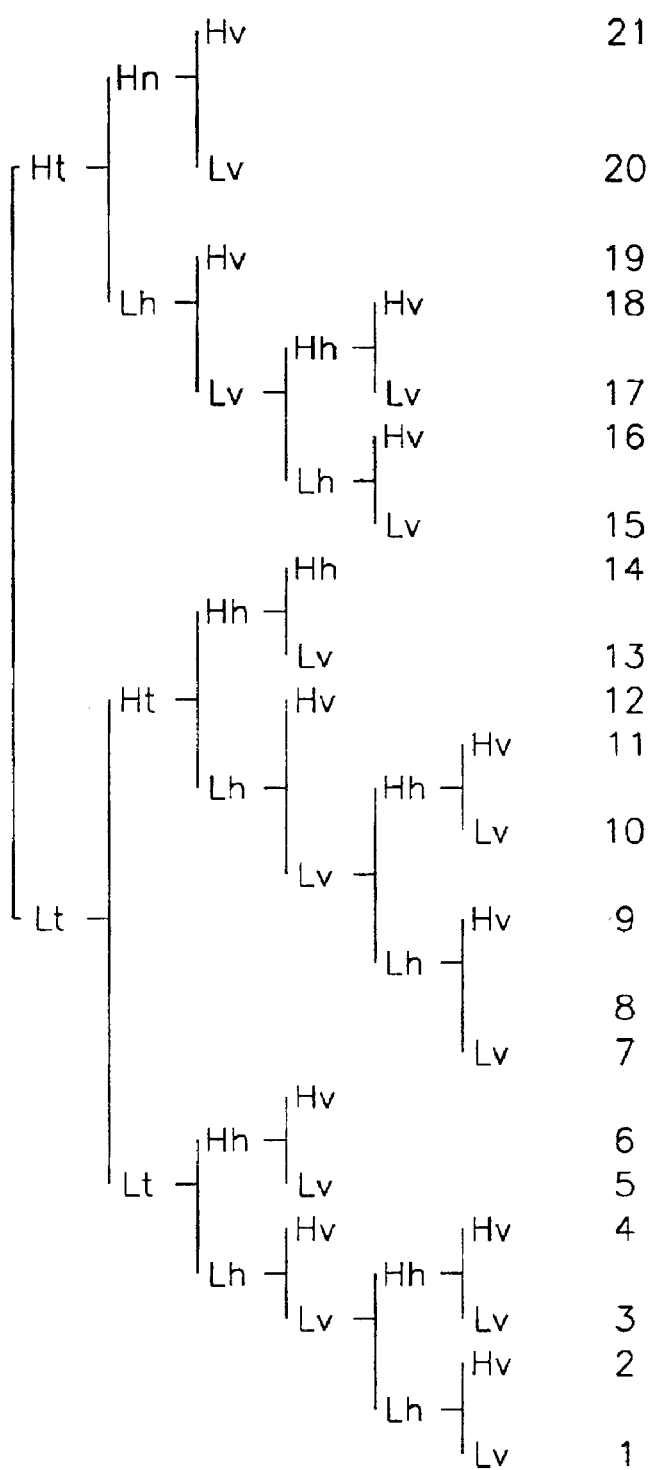
FIG. 8 is a schematic diagram illustrating a process for generating vector coefficients of a 3-dimensional wavelet transform, which is applied to the image coding apparatus shown in FIG. 4.

FIG. 8 is a schematic diagram illustrating a process for 3D wavelet decomposition. In particular, FIG. 8 shows 2-level 3D wavelet decomposition. That is, in the 3D wavelet decomposition applied to a 3D moving picture, similarity between frames is high and most time energy is concentrated on the low frequency band. Therefore, much spatial surplus exists in the temporal high frequency band. In the 3D wavelet transform, time wavelet decomposition is performed and then spatial wavelet decomposition is performed. Referring to FIG. 8, Ht and Lt indicate the results decomposed in a time region. Ht denotes a temporal high frequency sub-band and Lt denotes a temporal low frequency sub-band. Also, Hh/Lh and Hv/Lv indicate the results decomposed in a spatial region. Hh/Lh denotes a horizontal high frequency/low frequency sub-band and Hv/Lv denotes a vertical high frequency/low frequency sub-band.

Referring to FIG. 8, an image signal is first decomposed into a high frequency band (Ht) and a low frequency band (Lt). At this time, the temporal low frequency band (Lt) is again decomposed into a high frequency band and a low frequency band and then spatial decomposition is performed. The temporal low frequency band (Lt) is decomposed into a spatial horizontal high frequency band (Hh) and a spatial horizontal low frequency band (Lh). As described above, the horizontal low frequency band (Lh) in the spatial region is decomposed into a vertical high frequency band (Hv) and a vertical low frequency band (Lv) and then horizontal decomposition is again performed for the vertical low frequency band. This process is iterated to a predetermined level and a coefficient (1) in the lowest frequency band is generated. Also, referring to FIG. 8, the temporal high frequency band is also decomposed horizontally and vertically.

Although the temporal wavelet decomposition for the two levels is shown in FIG. 8, the image signal can be decomposed by various methods. Also, the higher the temporal similarity is, the more energy the 3D wavelet decomposition can concentrate on the low frequency band.

Figure 9:
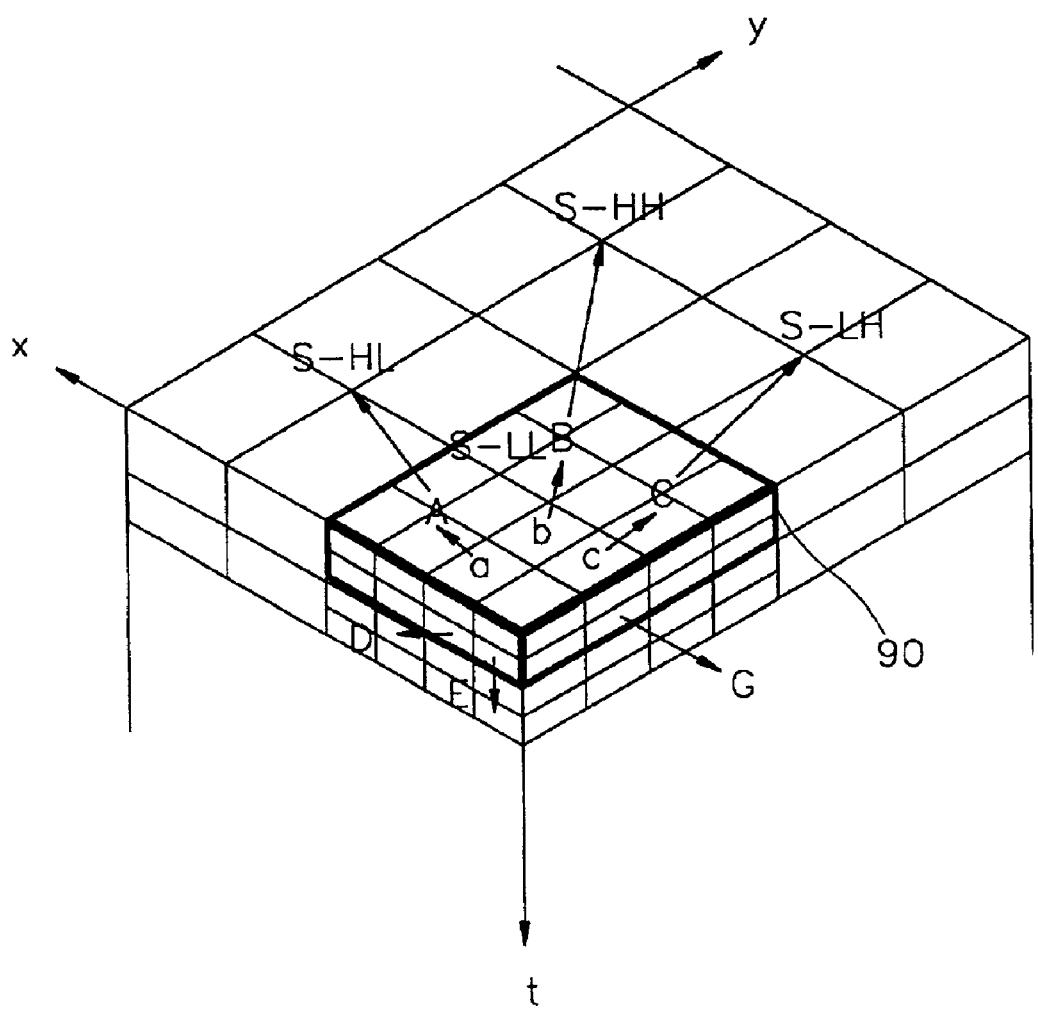
FIG. 9 is a schematic diagram illustrating the spatial relations of vector coefficients in a 3-dimensional wavelet transform.

FIG. 9 is a schematic diagram illustrating the spatial relations of coefficients in a 3-dimensional wavelet transform. Referring to FIG. 9, the spatial region formed by axis x and axis y and the time region by axis t are shown in a 3D region. That is, S-HH shows a high frequency band characteristic in the horizontal direction and vertical direction in the spatial region, and S-LH shows a low frequency band characteristic in the horizontal direction and a high frequency band characteristic in the vertical direction. Also, S-HL shows a high frequency band characteristic in the horizontal direction and a low frequency band characteristic in the vertical direction in the spatial region. S-LL shows a low frequency characteristic in the horizontal direction and vertical direction.

FIG. 10 is a flowchart illustrating an image coding method by 3D wavelet transform. Referring to FIGS. 8 through 10, the image coding method by 3D wavelet transform will now be described in more detail.

First, a 3D image signal is wavelet transformed in the time region in step 900. After wavelet transforming in the time region, wavelet transform is performed in the spatial region in step 910. At this time, according to the result of wavelet transformation in the time and spatial region, a 3D tree-structured vector is constructed in step 920. Referring to FIG. 9, in the tree structure formed in the spatial and time region, reference number 90 indicates the highest level. That is, by applying 3D wavelet transform to the 2D tree structure in a 2D image, the 2D tree structure is extended to the 3D tree structure. Therefore, the number of trees increases to 7 from 3. While the number of children coefficients stemming from a parent coefficient may be 4 in a 2D wavelet transform, the number increases to 8 when a 3D wavelet transform is applied. For example, when a 5-level 3D wavelet transform is performed, 4681 coefficients construct one vector. As described above, among the whole 7 vector trees, one basic vector is set and the remaining 6 trees are generated as error vectors in step 930. The number of error vectors increases compared to a 2D wavelet transform. The basic vector and error vectors are scanned in an appropriate direction considering the continuity of coefficients in step 940. Also, since in the scanning process a plurality of images form a sub-band, the scanning is performed 3-dimensionally depending on the location of a sub-band, which a person skilled in the art can easily predict. At this time, each of the scanned basic vector and error vectors is quantized by the vector quantizer and output as the index of the corresponding codebook in step 950.

That is, in the vector quantization step, the number of codebooks increases as the number of coefficients forming vectors increases. However, the increase in the number of the codebooks is smaller than the increase in the number of the coefficients. Therefore, the 3D coding method is more efficient than the 2D coding method. Also, when the index of a codebook generated in the vector quantization step is transmitted, the receiving side selects a vector corresponding to the index so that the original image can be restored.

Preferred embodiments of the present invention are described in the drawings and specification, and though specific terminologies are used here, these are only to explain the present invention. The present invention is not restricted to the above-described embodiments and many variations are possible within the spirit and scope of the present invention. The scope of the present invention is not determined by the description but by the accompanying claims.

According to the present invention, codebooks are generated using correlations between sub-bands of wavelet coefficients, which are used in the zerotree coding method, based on wavelet vector quantization. By doing so, the size of a codebook can be reduced and coding efficiency is improved so that the compression ratio can be enhanced. Also, in the coding method according to the present invention, wavelet transform is applied to the 2D packet transform and the 3D transform so that a high compression ratio and high quality images can be provided.

What is claimed is:

1. An apparatus for coding an image signal comprising:
   a wavelet transform unit for wavelet transforming an input image signal;
   a vector construct unit for constructing vectors using the wavelet transformed result, each vector having a tree structure in a different direction;
   an error vector generation unit for generating a plurality of error vectors by setting one of the vectors as a basic vector and performing a calculation on each of vectors remaining with respect to the basic vector;
   a scan unit for scanning the coefficients of each of the basic vector and error vectors in a different direction;
   a first vector quantization unit for generating a first codebook for the basic vector scanned in the scan unit, quantizing the scanned basic vector using the first codebook, and outputting the quantization result as the index of the first codebook; and
   a second vector quantization unit for generating a second codebook for the error vectors scanned in the scan unit, quantizing the scanned error vectors using the second codebook, and outputting the quantization results as the indices of the second codebook; wherein:
   the wavelet transform unit wavelet transforms the input image signal so that the low frequency sub-band of the image signal is decomposed in a 2-dimensional (2D) region;
   in the vector construct unit the coefficients of vectors having parent-children relations between sub-bands forms a tree structure and the tree structure is formed in the horizontal direction, in the vertical direction, and in the diagonal direction; and
   the error vector generation unit sets the diagonal direction vector as the basic vector and subtracts each of the horizontal direction vector and vertical direction vector from the basic vector to generate the error vectors.

2. The apparatus of claim 1, wherein the scan unit zigzag scans the coefficients of the basic vector and scans the coefficients of the error vectors in the horizontal direction and in the vertical direction.

3. The apparatus of claim 1, wherein the wavelet transform unit performs a 2-dimensional packet decomposition with respect to the input image signal.

4. The apparatus of claim 1, wherein if the image signal is moving pictures, the wavelet transform unit wavelet transforms the image signal in a time region and then wavelet transforms in a spatial region the signal which is wavelet transformed in the time region.

5. a method for coding an image signal comprising:
   (a) a wavelet transforming an input image signal;
   (b) constructing a vector having a tree structure in the horizontal direction, in the vertical direction, and in the diagonal direction, using the wavelet transformed result;
   (c) setting the diagonal direction vector as a basic vector and generating a plurality of error vectors by performing a calculation on each of the horizontal direction vector and vertical direction vector with respect to the basic vector;
   (d) scanning the basic vector and error vectors according to different methods;
   (e) generating a first codebook for the scanned basic vector, quantizing the scanned data using the first codebook, and outputting the quantization result as the index of the first codebook; and
   (f) generating a second codebook for the scanned error vectors, quantizing the scanned data using the second codebook, and outputting the quantization result as the second and third indices of the second codebook; wherein
   in step (a) a wavelet transform is performed so that the low frequency sub-band of the image signal is decomposed in a 2D region; and
   in step (c) the error vectors are generated by subtracting the horizontal direction vector and the vertical direction vector from the basic vector.

6. The method of claim 5, wherein in step (c) the image signal is decomposed by a 2D packet decomposition.

7. The method of claim 6, wherein a vector having an adaptive tree structure is constructed according to the result of the wavelet packet transform.

8. An apparatus for coding an image signal comprising:
   a wavelet transform unit for wavelet transforming an input image signal;
   a vector construct unit for constructing vectors using the wavelet transformed result, each vector having a tree structure in a different direction;
   an error vector generation unit for generating a plurality of error vectors by setting one of the vectors as a basic vector and performing a calculation on each of vectors remaining with respect to the basic vector;
   a scan unit for scanning the coefficients of each of the basic vector and error vectors in a different direction;
   a first vector quantization unit for generating a first codebook for the basic vector scanned in the scan unit, quantizing the scanned basic vector using the first codebook, and outputting the quantization result as the index of the first codebook; and
   a second vector quantization unit for generating a second codebook for the error vectors scanned in the scan unit, quantizing the scanned error vectors using the second codebook, and outputting the quantization results as the indices of the second codebook; wherein:
   the wavelet transform unit wavelet transforms the input image signal so that the low frequency sub-band of the image signal is decomposed in a 2-dimensional (2D) region;
   in the vector construct unit the coefficients of vectors having parent-children relations between sub-bands form a tree structure and the tree structure is formed in the horizontal direction, in the vertical direction, and in the diagonal direction; and
   the error vector generation unit sets the diagonal direction vector as the basic vector and adds each of the horizontal direction vector and vertical direction vector to the basic vector to generate the error vectors.

9. The apparatus of claim 8, wherein the scan unit zigzag scans the coefficients of the basic vector and scans the coefficients of the error vectors in the horizontal direction and in the vertical direction.

10. The apparatus of claim 8, wherein the wavelet transform unit performs a 2-dimensional packet decomposition with respect to the input image signal.

11. The apparatus of claim 8, wherein if the image signal is moving pictures, the wavelet transform unit wavelet transforms the image signal in a time region and then wavelet transforms in a spatial region the signal which is wavelet transformed in the time region.

12. A method for coding an image signal comprising:
   (a) wavelet transforming an input image signal;

(b) constructing a vector having a tree structure in the horizontal direction, in the vertical direction, and in the diagonal direction, using the wavelet transformed result;

(c) setting the diagonal direction vector as a basic vector and generating a plurality of error vectors by performing a calculation on each of the horizontal direction vector and vertical direction vector with respect to the basic vector;

(d) scanning the basic vector and error vectors according to different methods;

(e) generating a first codebook for the scanned basic vector, quantizing the scanned data using the first codebook, and outputting the quantization result as the index of the first codebook; and (f) generating a second codebook for the scanned error vectors, quantizing the scanned data using the second codebook, and outputting the quantization results as the second and third indices of the second codebook; wherein in step (a) a wavelet transform is performed so that the low frequency sub-band of the image signal is decomposed in a 2D region; and in step (c) the error vectors are generated by adding the horizontal direction vector and the vertical direction vector to the basic vector.

13. The method of claim 12, wherein in step (c) the image signal is decomposed by a 2D packet decomposition.

14. The method of claim 12, wherein a vector having an adaptive tree structure is constructed according to the result of the wavelet packet transform.

* * * * *

UNITED STATES PATENT AND TRADEMARK OFFICE
CERTIFICATE OF CORRECTION

PATENT NO. : 6,931,067 B2
DATED : August 16, 2005
INVENTOR(S) : Woo-young Jang

It is certified that error appears in the above-identified patent and that said Letters Patent is hereby corrected as shown below:

Column 11,
Line 51, delete "a" before "wavelet".

Signed and Sealed this

Third Day of January, 2006

JON W. DUDAS
*Director of the United States Patent and Trademark Office*